Figure 4:
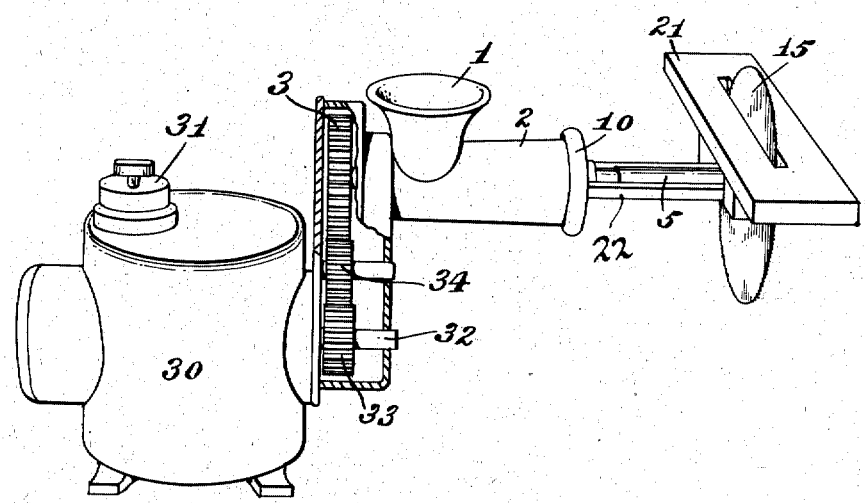

E. BACK.
BONE SAWING ATTACHMENT FOR FOOD CHOPPERS.
APPLICATION FILED MAY 14, 1909.
984,413.
Patented Feb. 14, 1911.
2 SHEETS—SHEET 1.
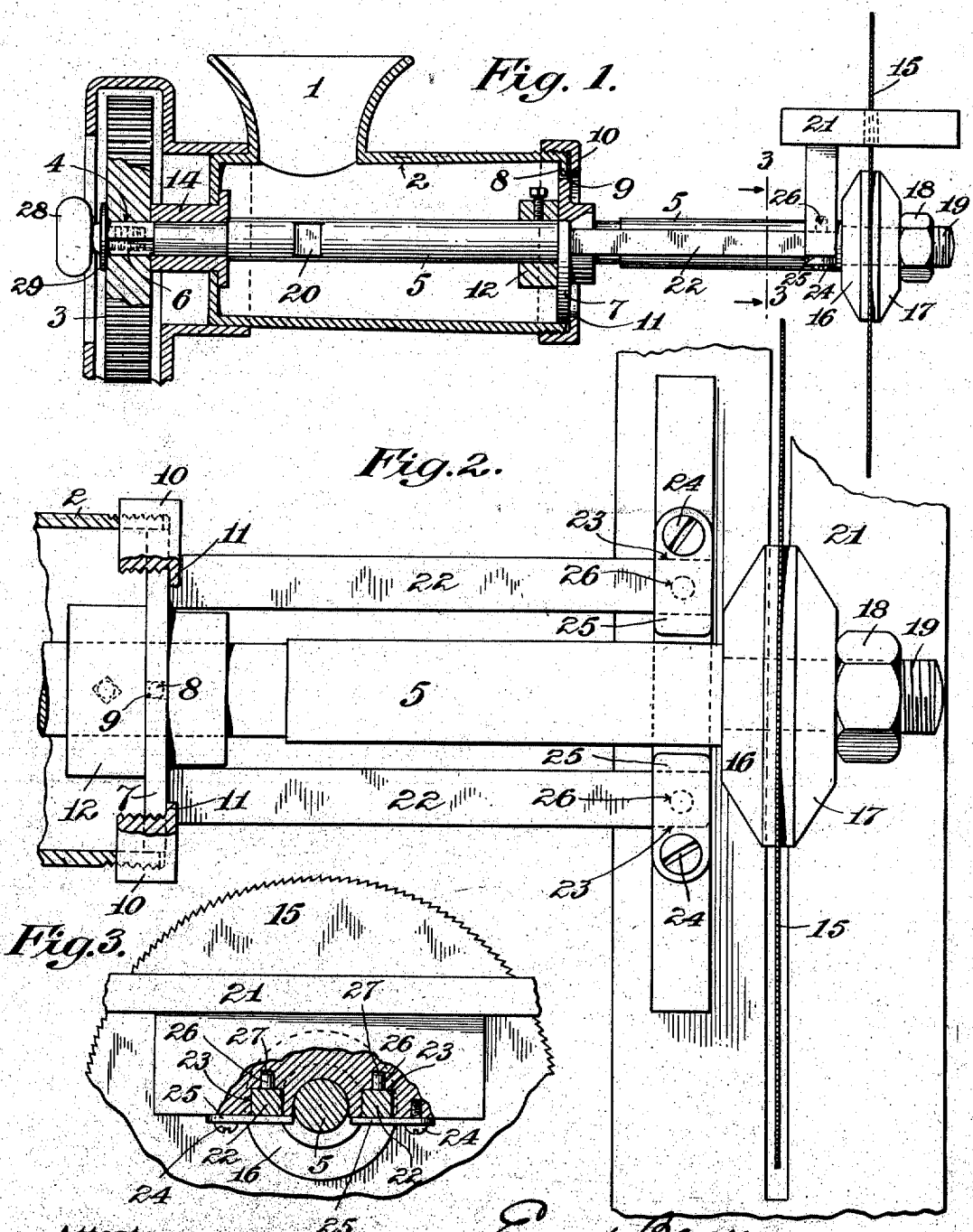
Attest:
Walter McGinn
Eazeworth
Ernest Back  Inventor:
by E.W. Scheuer Jr.
his Atty.

E. BACK.
BONE SAWING ATTACHMENT FOR FOOD CHOPPERS.
APPLICATION FILED MAY 14, 1909.

984,413.

Patented Feb. 14, 1911.

2 SHEETS—SHEET 2.

UNITED STATES PATENT OFFICE.

ERNEST BACK, OF NEW YORK, N. Y.

BONE-SAWING ATTACHMENT FOR FOOD-CHOPPERS.

984,413.  Specification of Letters Patent. Patented Feb. 14, 1911.

Application filed May 14, 1909. Serial No. 495,863.

*To all whom it may concern:*

Be it known that I, ERNEST BACK, a citizen of the United States, and a resident of the city, county, and State of New York, have invented certain new and useful Improvements in Bone-Sawing Attachments for Food-Choppers, of which the following is a specification.

The object of my invention is to provide an attachment including a circular saw for cutting up bones and the like, and adapted to be readily attached and detached in driving connection with the driving mechanism of the food or meat chopper.

In the drawings, which show only one of the particular forms which my invention may take, Figure 1 is a vertical longitudinal section of the cylinder or upper portion of a chopper showing the attachment in elevation; Fig. 2 is a bottom plan view of the end of the attachment on a somewhat larger scale; Fig. 3 is a cross sectional view on the line 3—3 of Fig. 1; and Fig. 4 is a perspective view of a food chopper to which my attachment has been temporarily applied (and from which it is part of my invention that the attachment should be readily removable), a part of the casing of said chopper being broken away to show internal structure.

Describing now the devices of the drawings and reserving it to the claims to point out the novel features and to define the scope of the invention, the attachment is shown in connection with a meat chopper. Thus, 1 is the hopper of the chopper, 2 the cylinder and 3 a driving gear. The rest of the chopper shown in Fig. 4, need only be indicated briefly. Thus, 30 is an electric motor, 31 its operating switch, 32 is the motor shaft carrying gear 33 which drives the above-mentioned gear 3 through an intermediate gear 34.

In the ordinary chopper a feed screw is mounted in the cylinder and has the inner end of its shaft squared for driving connection with a corresponding center or hole 4 in the driving gear 3. To connect the particular form shown of the present attachment with such a chopper, the feed screw is removed and the inner end of the shaft of the attachment is inserted in its place in the cylinder with a squared end of the shaft received in driving engagement with the gear. The shaft referred to is designated 5 and has the squared inner end 6. The shaft has an outer bearing consisting of a journal member that is shown in the form of a hole in a disk 7 received into the mouth of the cylinder 2. There is a locking connection between the disk and the cylinder preventing rotation of the disk and consisting of a pin 8 projecting inwardly from the mouth of the cylinder and received into a notch 9 in the periphery of the disk. An internally threaded ring 10 is provided, engaging external threads about the mouth of the cylinder and having an end flange 11 which contacts with the outer face of the disk 7 preventing the disk from coming out of the mouth of the cylinder. The shaft has a collar 12 next the inner face of the disk which prevents the shaft from coming out of the cylinder or, more importantly, prevents its squared end from coming out of driving connection with the gear. In the particular attachment shown, the inner end of the shaft is reduced in diameter to be received with bearing fit through the bushing 14 that is ordinarily found in choppers at the inner end of the cylinder. This bushing, of course, acts as an inside bearing for the shaft.

15 is a circular saw mounted on the shaft at a convenient distance beyond the disk 7. It is clamped securely between the fixed collar 16 on the shaft and a movable collar 17 by a nut 18 engaging threads 19 on the shaft. A squared portion 20 is provided on the shaft for engagement by a wrench to prevent the shaft from turning when the wrench is applied to the nut 18 to clamp and rigidly secure the saw between the collars 16 and 17.

21 is a table or rest having a slot through which the upper edge of the saw projects. The table is supported stationarily from the disk 7 by arms 22 projecting from the disk in a horizontal plane at the sides of the shaft. The foot portion of the table has on its under side recesses 23 receiving snugly into them the respective cross sections of the arms 22. Pivoted at 24 under the foot portion to swing in a horizontal plane under the respective arms when seated in the aforesaid recesses, are catches 25. When in this locking position, these catches prevent lifting the table off the arms. On the other hand, to prevent the table from having endwise movement on the arms, pins 26 project from the arms into sockets 27 in the walls of the recesses 23. For additional security for holding the gear and shaft together, a thumb screw 28 may be provided threading into the inner end of the shaft and having a flange 29 received against the side of the gear and holding it on the shaft.

The working of the attachment will be readily apparent since upon setting into operation the chopper, the circular saw will be driven and bones are readily cut up by pushing them forward upon the table against the saw. The above description also makes plain the readiness with which the attachment can be attached and detached from the chopper.

In some choppers, the cylinder 2 is removable and the present attachment is applicable thereto with immaterial modification, consisting primarily in the shortening of the shaft in that portion which is in the cylinder.

Having thus described my invention, what I claim is:

1. A bone-sawing attachment comprising a rotatable shaft, a saw mounted thereon at one end, a journal member having a bearing-opening through it for said shaft, arms projecting toward the saw from the journal member, a saw table having recesses in its bottom into which fit the cross-section of the arms, catches on the bottom of the table movable into and out of position to retain the arms in said recesses, and means between the table and the arms preventing endwise movement of the table along the arms, as and for the purpose set forth.

2. In apparatus of the character set forth, the combination with a tubular support, and driving mechanism mounted on one end of the same, of a journal member detachably mounted on the other end of the support, a shaft journaled in said member and having one end extending longitudinally within the tubular support and detachably engaging the driving mechanism, means for holding the shaft against longitudinal movement in the journal member and against consequent disengagement from the driving mechanism, a saw carried by the shaft and located outside the tubular support, and a saw table coöperating with the saw and carried by the journal member.

3. In apparatus of the character set forth, the combination with a tubular support, and driving mechanism mounted on one end of the same, of a journal member detachably fitted into the other end of the support, means detachably mounted on the support for holding said journal member against disengagement from the support, a shaft journaled in the member and extending longitudinally within the tubular support, said shaft detachably engaging the driving mechanism, a device carried by the shaft and engaging the inner side of the journal member for preventing outward longitudinal movement of the shaft and inward longitudinal movement of the journal member, a saw carried by the projecting end of the shaft, and a saw table carried by the journal member and coöperating with the saw.

Witness my hand this 30th day of April 1909, at New York N. Y.

ERNEST BACK.

Witnesses:
E. W. SCHEUP,
P. C. SHULTZ.